US011208158B1

(12) United States Patent
Kim (10) Patent No.: US 11,208,158 B1
(45) Date of Patent: Dec. 28, 2021

(54) FRONT CAB TILTING STAY APPARATUS OF TRUCK

(71) Applicants: Hyundai Motor Company, Seoul (KR); Kia Motors Corporation, Seoul (KR)

(72) Inventor: Dae Su Kim, Jeonju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/015,362

(22) Filed: Sep. 9, 2020

(30) Foreign Application Priority Data

Jun. 15, 2020 (KR) .................. 10-2020-0072547

(51) Int. Cl.
*B62D 33/07* (2006.01)
(52) U.S. Cl.
CPC .................. *B62D 33/07* (2013.01)
(58) Field of Classification Search
CPC ..... B62D 33/067; B62D 33/07; B62D 33/063
USPC .................................... 296/190.06
See application file for complete search history.

(56) References Cited

U.S. PATENT DOCUMENTS

| 2,947,376 A | * | 8/1960 | Norrie | B62D 33/067 |
| | | | | 180/89.15 |
| 2014/0103183 A1 | * | 4/2014 | Lokhande | B62D 33/07 |
| | | | | 248/352 |

FOREIGN PATENT DOCUMENTS

| DE | 4316953 A1 | * | 11/1994 | ............ B62D 33/07 |
| JP | 57205278 A | * | 12/1982 | ........... B62D 33/067 |
| JP | 60076480 A | * | 4/1985 | ............ B62D 33/07 |
| JP | 60094876 A | * | 5/1985 | ............ B62D 33/07 |
| JP | 60099773 A | * | 6/1985 | ............ B62D 33/07 |
| KR | 10-2016-0015978 A | | 2/2016 | |
| KR | 2016015978 A | * | 2/2016 | |

* cited by examiner

*Primary Examiner* — Hilary L Gutman
(74) *Attorney, Agent, or Firm* — Morgan, Lewis & Bockius LLP (57) ABSTRACT

A front cab tilting stay apparatus of a truck may include a stay rod connecting a vehicle body and a front cab, a stay lever and a hook ring provided in the stay rod, and a locking mechanism provided in the stay lever, wherein the locking mechanism includes a rotation lever rotatably coupled to the stay lever via a lever shaft, wherein a tilting state of the front cab is configured to be maintained by an engagement between the locking mechanism and the hook ring in the tilting state of the front cab in which the stay rod is extended straight as the front cab is rotated in a predetermined direction.

16 Claims, 10 Drawing Sheets

FRONT CAB TILTING STAY APPARATUS OF TRUCK

CROSS REFERENCE TO RELATED APPLICATION

The present application claims priority to Korean Patent Application No. 10-2020-0072547, filed Jun. 15, 2020, the entire contents of which is incorporated herein for all purposes by this reference.

BACKGROUND OF THE INVENTION

Field of the Invention

The present invention relates to a front cab tilting stay apparatus of a truck, and more particularly, to a technology for a front cab tilting stay apparatus of a truck, capable of improving the convenience and safety upon tilting of the front cab.

Description of Related Art

In general, small to medium-sized trucks include a front cab provided with a driver's seat and a passenger seat, and a rear deck which is a space for loading cargo, wherein the front cab is provided with a tilting structure which may be rotated forward by a mechanic when necessary for vehicle maintenance, for example.

Maintaining a tilting state of the front cab being rotated forward may be performed by a tilting stay apparatus connecting a vehicle body and the front cab. In the conventional tilting stay apparatus, after a stay rod connecting a front cab and a vehicle body is extended straight, a safety pin is inserted into the stay rod so that the stay rod is prevented from being rotated, maintaining the tilting state of the front cab. However, there are disadvantages in that workability is degraded due to troublesome inserting of the safety pin into the hole of the stay rod, and in some cases, safety accidents are frequently caused by the mechanic omitting the task of inserting safety pins.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a front cab tilting stay apparatus configured for performing a tilting stay operation of a front cab through a simple rotational operation of a rotation lever coupled to a stay lever, improving safety and convenience of operation.

In various aspects of the present invention, various aspects according to various aspects of the present invention, there is provided a front cab tilting stay apparatus of a truck, the apparatus including: a stay rod connecting a vehicle body and a front cab; a stay lever and a hook ring provided in the stay rod; and a locking mechanism provided in the stay lever, wherein the locking mechanism includes a rotation lever rotatably coupled to the stay lever via a lever shaft, wherein a tilting state of the front cab is configured to be maintained by an engagement between the locking mechanism and the hook ring in the tilting state of the front cab in which the stay rod is extended straight as the front cab is rotated in a predetermined direction.

The stay rod may include an upper stay rod portion and a lower stay rod portion rotatably coupled to each other via a connection pin while being rotatably coupled to the front cab and the vehicle body, respectively; and the stay lever may be rotatably coupled to the upper stay rod portion at a connection portion of the upper stay rod portion and the lower stay rod portion, and the hook ring is fixedly mounted to the lower stay rod portion.

The hook ring may be an "L"-shaped bracket protruding in one side from the lower stay rod portion and then bent upward, in a state in which the upper and lower stay rod portions are extended straight.

The locking mechanism may include: a gear member and a rotation shaft connected each other to sequentially transmit the rotational force of the lever shaft; and a stopper coupled to an end portion of the rotation shaft to rotate together with the rotation shaft and configured such that when the stopper is engaged with the hook ring, a locked state of the stay lever to lower stay rod portion is maintained so that the rotation of the stay lever is impossible, and when the stopper is disengaged from the hook ring, the stopper switches to an unlocked state to enable rotation of the stay lever.

The rotation lever may be rotatably coupled via the lever shaft to extend in the longitudinal direction of the stay lever at the end portion of the stay lever.

When the stopper rotates at a 90 degree angle in one direction in the unlocked state in which the stopper is not engaged with the hook ring so that the stopper is rotated and engaged with the hook ring, the stay lever may become a locked state in which rotation of the stay lever is impossible; and when the rotation lever rotates at a 90 degree angle in an opposite direction in the locked state to return to its original position so that the stopper is rotated and disengaged from the hook lever, the stay lever may become an unlocked state in which a rotation of the stay lever is possible.

Contact surfaces of the stay lever and the rotation lever may be provided with a hemispherical concave groove and a hemispherical protrusion, respectively, so that a rotation angle of the rotation lever with respect to the stay lever is determined by the protrusion being inserted into the concave groove when the rotation lever rotates.

A flange portion may be further formed to protrude in a right angle direction from the contact surface of the rotation lever; and a hemispherical protrusion may be provided on the contact surface of the flange portion.

In the rotation lever, a sign or text indicating the locked and unlocked states of the stay lever may be indicated at angular intervals of 90 degree.

According to the front cab tilting stay apparatus of the present invention, when a rotation lever coupled to the stay lever is rotated, the stopper is engaged/disengaged with/from the hook ring provided on the lower stay rod so that the stay lever switches between a locked state and an unlocked state, while realizing effects of performing the tilting stay of the front cab with a simple rotational operation of the rotation lever, improving convenience and safety of the operation.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural or functional descriptions of the exemplary embodiments of the present invention included herein are merely exemplified for illustrating the exemplary embodiments according to various exemplary embodiments of the present invention, and the exemplary embodiments of the present invention are implemented in various forms, and may not be construed as being limited to the exemplary embodiments described In various exemplary embodiments of the present invention or application.

Since the exemplary embodiment according to various exemplary embodiments of the present invention may be diversely modified into various forms, specific embodiments will be illustrated and described in detail in the drawings and the description of the present invention. However, this is not intended to limit the exemplary embodiments according to the concept of the present invention to specific disclosure forms, but may be understood to include all modifications, equivalents, or substitutes included in the spirit and scope of the present invention.

It will be understood that although the terms "first", "second", etc. may be used herein to describe various elements, these elements may not be limited by these terms. These terms are only used to distinguish one element from another element. Thus, a first element discussed below could be termed a second element and vice versa without departing from the nature of the present invention.

It will be understood that when an element is referred to as being "connected" or "coupled" to another element, it may be directly connected or coupled to the other element or intervening elements may be present therebetween. In contrast, when an element is referred to as being "directly connected" to another element, there are no intervening elements present. Other expressions describing the relationship between the components, such as "between" and "immediately between" or "neighboring" and "directly neighboring" may also be interpreted in the same manner.

The terminology used herein is for describing various exemplary embodiments only and is not intended to limit the present invention. As used herein, the singular forms "a", "an", and "the" are intended to include the plural forms as well, unless the context clearly indicates otherwise. It will be further understood that the terms "comprises" and/or "comprising", or "includes" and/or "including", when used in various exemplary embodiments of the present invention, specify the presence of stated features, integers, steps, operations, elements, components or combinations thereof, but do not preclude the presence or addition of one or more other features, integers, steps, operations, elements, components, or combinations thereof.

Unless otherwise defined, the meaning of all terms including technical and scientific terms used herein is the same as that commonly understood by one of ordinary skill in the art to which various exemplary embodiments of the present invention belongs. It will be further understood that terms, such as those defined in commonly used dictionaries, may be interpreted as having a meaning which is consistent with their meaning in the context of the relevant art and the present invention, and will not be interpreted in an idealized or overly formal sense unless so defined herein.

Hereinafter, a front cab tilting stay apparatus according to various exemplary embodiments of the present invention will be described with reference to the accompanying drawings.

Figure 1:
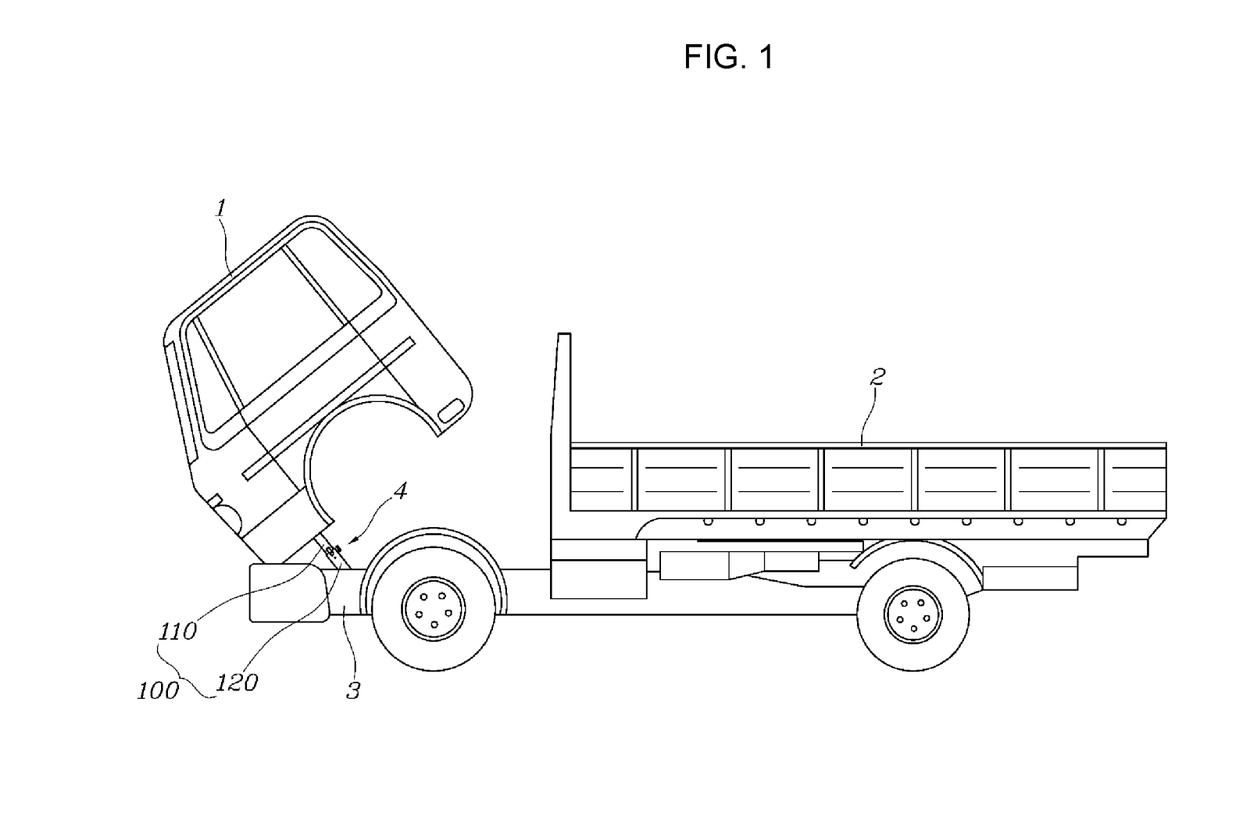
FIG. 1 is a view exemplarily illustrating a tilting state of a front cab being rotated forward by a front cab tilting stay apparatus according to various exemplary embodiments of the present invention.

As illustrated in FIG. 1, small to medium-sized trucks include a front cab 1 provided with a driver's seat and a passenger seat, and a rear deck 2 which is a space for loading cargo, wherein the front cab 1 is provided with a tilting structure which may be rotated forward by a mechanic when necessary for vehicle maintenance, for example.

Figure 2:
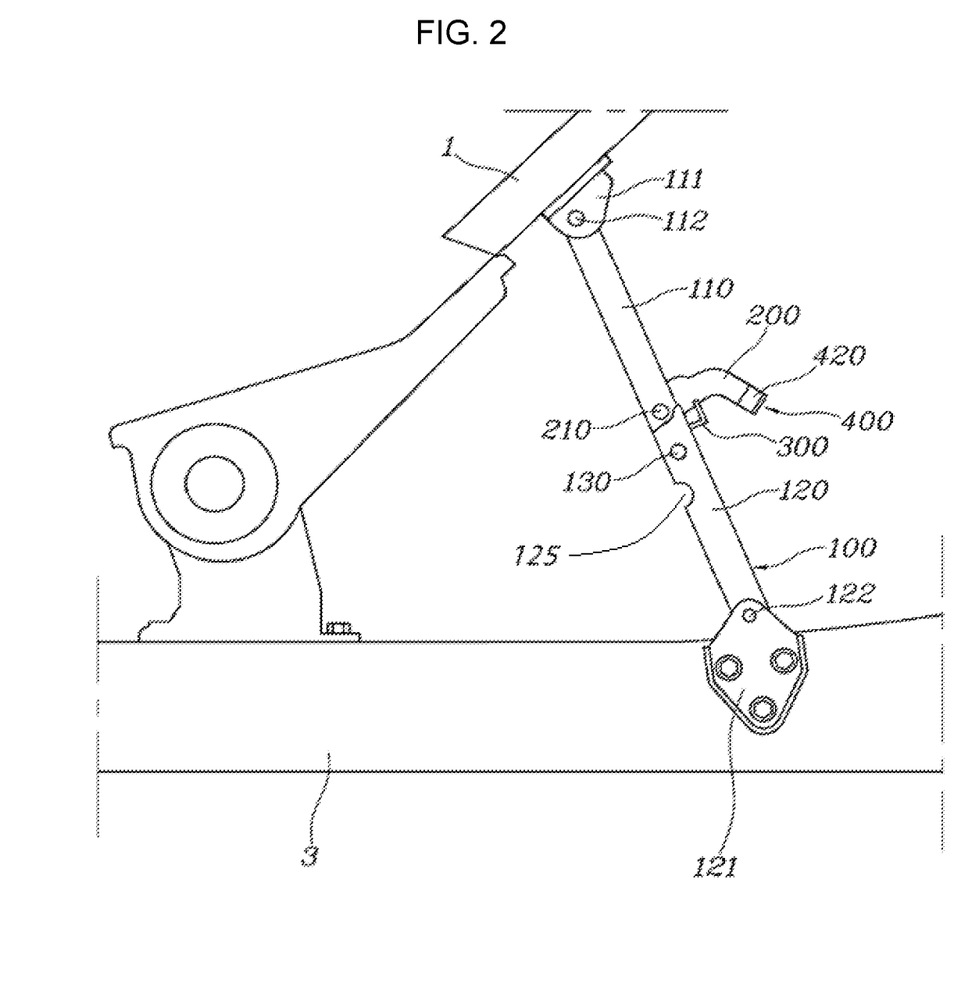
FIG. 2 is a view exemplarily illustrating a stay rod extending in a straight line from the state of FIG. 1.
Figure 3:
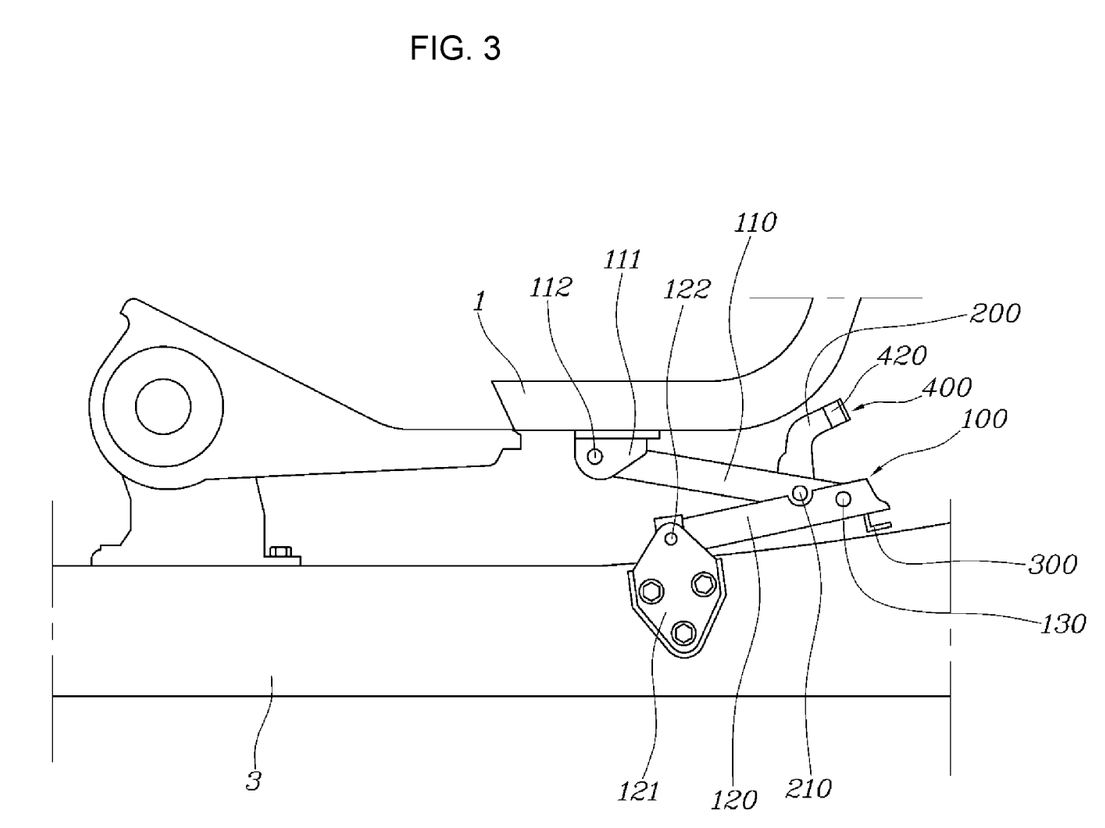
FIG. 3 is a view exemplarily illustrating a state in which the stay rod is folded when the front cab is tilted downwards.

FIG. 1 is a view exemplarily illustrating a tilting state of the front cab 1 being rotated forward, FIG. 2 is a view exemplarily illustrating a stay rod 100 extending in a straight line, and FIG. 3 is a view exemplarily illustrating a state in which the stay rod 100 is folded when the front cab 1 is tilted downwards.

Maintaining the tilting state of the front cab 1 being rotated forward may include a tilting stay apparatus 4 connecting a vehicle body 3 and the front cab 1.

As illustrated in FIGS. 1 to 10, the front cab tilting stay apparatus 4 of a truck according to the exemplary embodiment of the present invention includes a stay rod 100 connecting the vehicle body 3 and the front cab 1, a stay lever 200 and a hook ring 300, which are provided in the stay rod 100, and a locking mechanism 400 provided in the stay lever 200 such that the tilting state of the front cab 1 is maintained by the engagement between the locking mechanism 400 and the hook ring 300 in the tilting state of the front cab 1 in which the rod 100 is extended in a straight line as the front cab 1 is rotated forward thereof.

The stay rod 100 includes an upper stay rod portion 110 and a lower stay rod portion 120.

A bracket 111 is fixedly coupled to the front cab 1, and an upper portion of the upper stay rod portion 110 is rotatably coupled to the bracket 111 via a first pin 112. The bracket 121 is fixedly coupled to the vehicle body 3 below front cab 1, and a lower portion of the lower stay rod portion 120 is rotatably coupled to the bracket 121 via a second pin 122.

A lower portion of the upper stay rod portion 110 and an upper portion of the lower stay rod portion 120 are fitted to overlap with each other, and a connection pin 130 is coupled to the overlapped portion, so that the upper stay rod portion 110 and the lower stay rod portion 120 are coupled to each other in a rotatable structure about a connection pin 130.

In an exemplary embodiment of the present invention, the lower stay rod portion 120 may include a groove 125 and a lever pin 210 of the upper stay rod portion 110 and the groove 125 of the lower stay rod portion 120 are coupled to each other in a rotatable structure about the connection pin 130

The stay lever 200 is rotatably coupled to the upper stay rod portion 110 via the lever pin 210 at a connection portion of the upper stay rod portion 110 and the lower stay rod portion 120, and the hook ring 300 is fixedly provided to the lower stay rod portion 120.

The hook ring 300 is formed like an "L"-shaped bracket that protrudes in one direction and is bent upwards in the state in which the upper end rod portion 110 and the lower stay rod portion 120 are extended straight, and may be fixedly welded to the upper stay rod portion 110.

The locking mechanism 400 includes: a rotation lever 420 rotatably coupled to the stay lever 200 via a lever shaft 410; a gear member 430 and a rotation shaft 440 connected to sequentially transmit the rotational force of the lever shaft 410; and a stopper 450 coupled to the rotation shaft 440 to rotate together with the rotation shaft such that during the rotation of the rotation shaft 440, when engaged with the hook ring 300, a locked state is obtained in which the stay lever 200 cannot be rotated, and when the stopper is disengaged from the hook ring 300, an unlocked state is obtained in which the stay lever 200 may be rotated about the lever pin 210.

The rotation lever 420 is rotatably coupled via the lever shaft 410 to extend in the longitudinal direction of the stay lever 200 at the end portion of the stay lever 200 for ease of operation by the operator.

The lever shaft 410 and the rotation shaft 440 extend in the longitudinal direction of the stay lever 200. The lever shaft 410 and the rotation shaft 440 are mounted at a predetermined angle along the shape of the stay lever 200. The lever shaft 410 and the rotation shaft 440 are connected to allow for power transmission through the gear member 430. The gear member 430 is preferably, but is not limited to, a bevel gear which is provided for power transmission of the lever shaft 410 and the rotation shaft 440 forming an obtuse angle.

The stopper 450 is an L-shaped bracket, one end portion of which is coupled to the rotation shaft 440 to rotate together with the rotation shaft 440, and in which when the rotation shaft 440 is rotated, the other end portion of the stopper 450 is rotated toward the hook ring 300 to be engaged with the hook ring, or to be disengaged from the hook ring 300.

Figure 4:
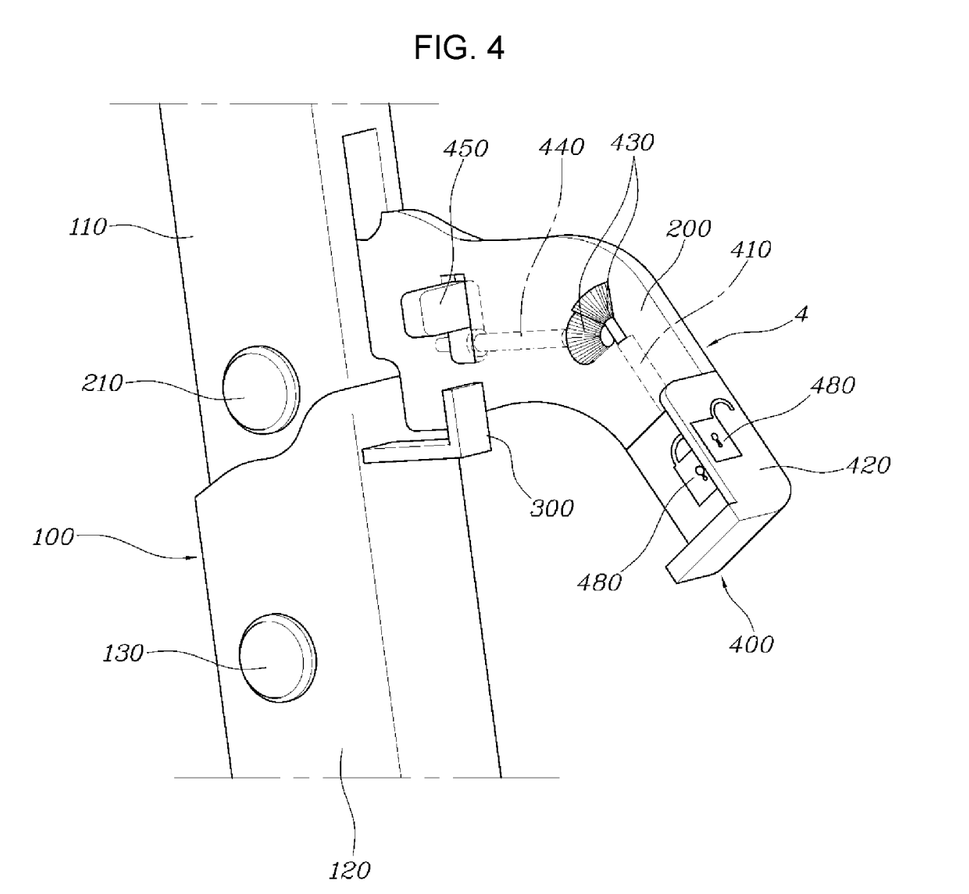
FIG. 4 is a view exemplarily illustrating an unlocked state in which a stopper is not engaged with a hook ring in the tilting stay apparatus according to various exemplary embodiments of the present invention.
Figure 8:
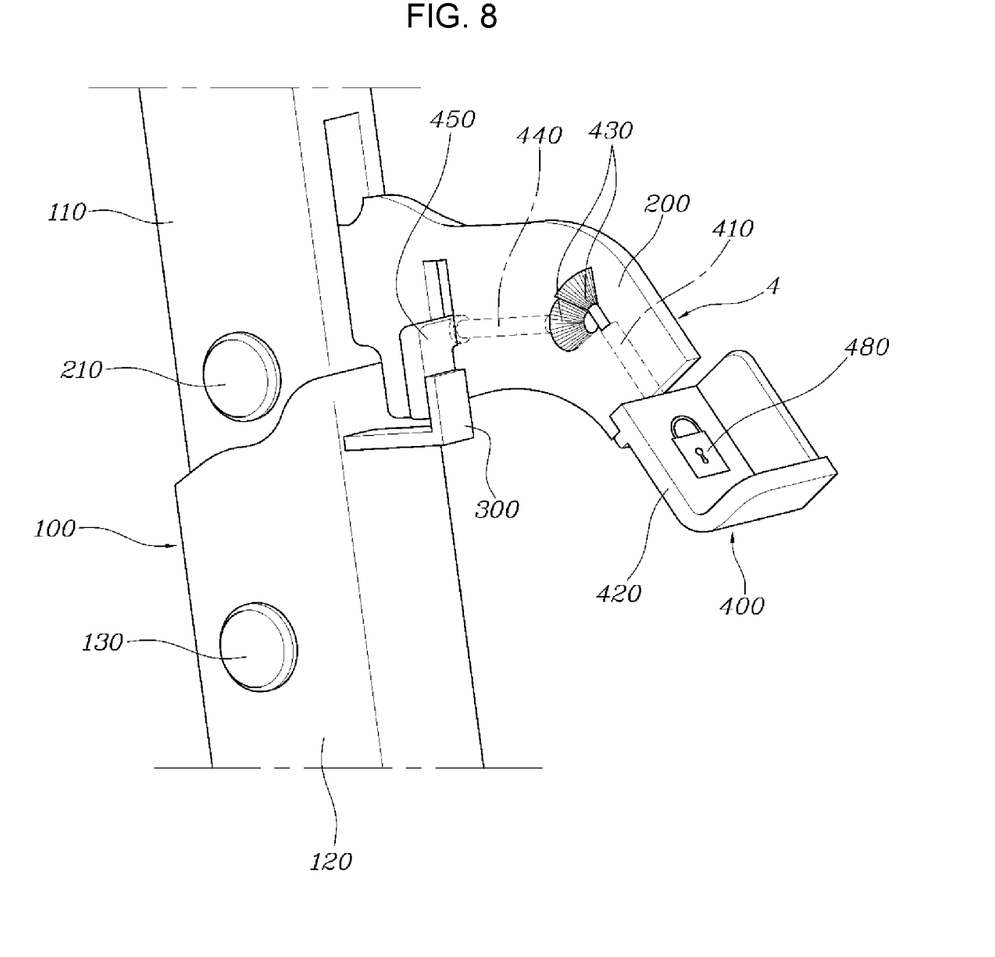
FIG. 8 is a view exemplarily illustrating the locked state in which the rotation lever of FIG. 4 rotates at a 90 degree angle clockwise so that the stopper is engaged with the hook ring.

That is, when the stopper 450 rotates at a 90 degree angle in one direction as illustrated in FIG. 8 from the unlocked state in which the stopper 450 is disengaged from the hook ring 300 as illustrated in FIG. 4, the stopper 450 is rotated and switched to the locked state in which the stopper 450 is engaged with the hook ring 300 so that the stay lever 200 cannot be rotated.

Accordingly, when the rotation lever 420 rotates at a 90 degree angle in an opposite direction and returns to the state of FIG. 4 from the locked state of FIG. 8, the stopper 450 is rotated and disengaged from the hook ring 300, so that the stay lever 200 is switched to the unlocked state in which the stay lever may be rotated.

On the other hand, the contact surfaces of the stay lever 200 and the rotation lever 420 are provided with a hemispherical concave groove 220 and a hemispherical protrusion 460, respectively, so that during the rotation of the rotation lever 420, the protrusion 460 is inserted into the concave groove 220 to determine the rotation angle of the rotation lever 420.

On the other hand, unlike the above embodiment, the contact surface of the stay lever 200 is provided with a hemispherical protrusion and the contact surface of the rotation lever 420 is provided with a hemispherical concave groove.

The contact surface of the stay lever 200 at a distal end portion has a straight shape, and two concave grooves 220 are formed at an angular interval of 180 degrees in the straight-shaped contact surface. Furthermore, the contact surface of the rotation lever 420 is also of a straight shape, and the two projections 460 are formed to be disposed at an angular interval of 180 degrees in the straight-shaped contact surface. A flange portion 470 is further formed to protrude orthogonally from the contact surface of the rotation lever 420, and a hemispherical protrusion 460 is further provided on the contact surface of the flange portion 470.

There are a total of three protrusions 460 provided on the rotation lever 420 at angular intervals of 90 degree.

Figure 5:
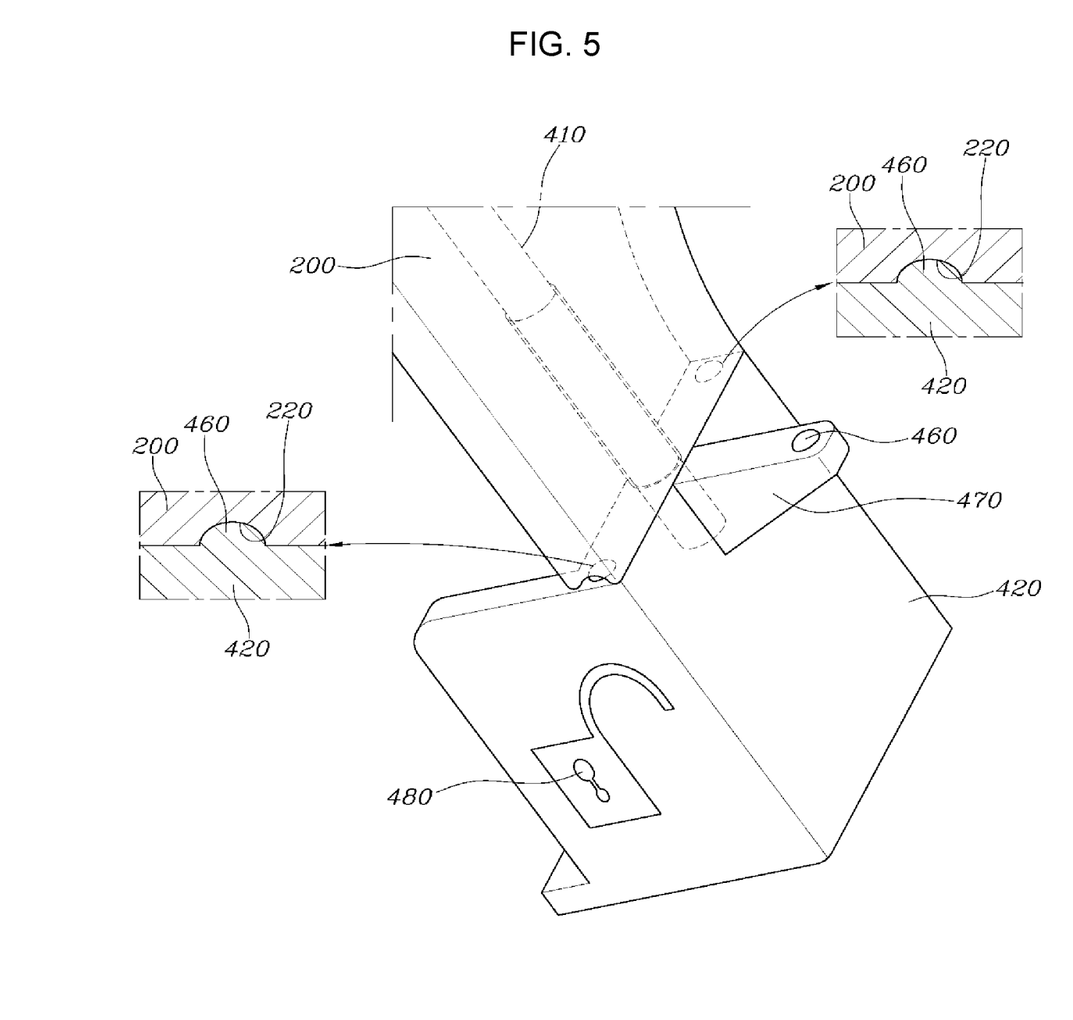
FIG. 5 is a view exemplarily illustrating a portion to which a rotation lever is connected in FIG. 4.
Figure 6:
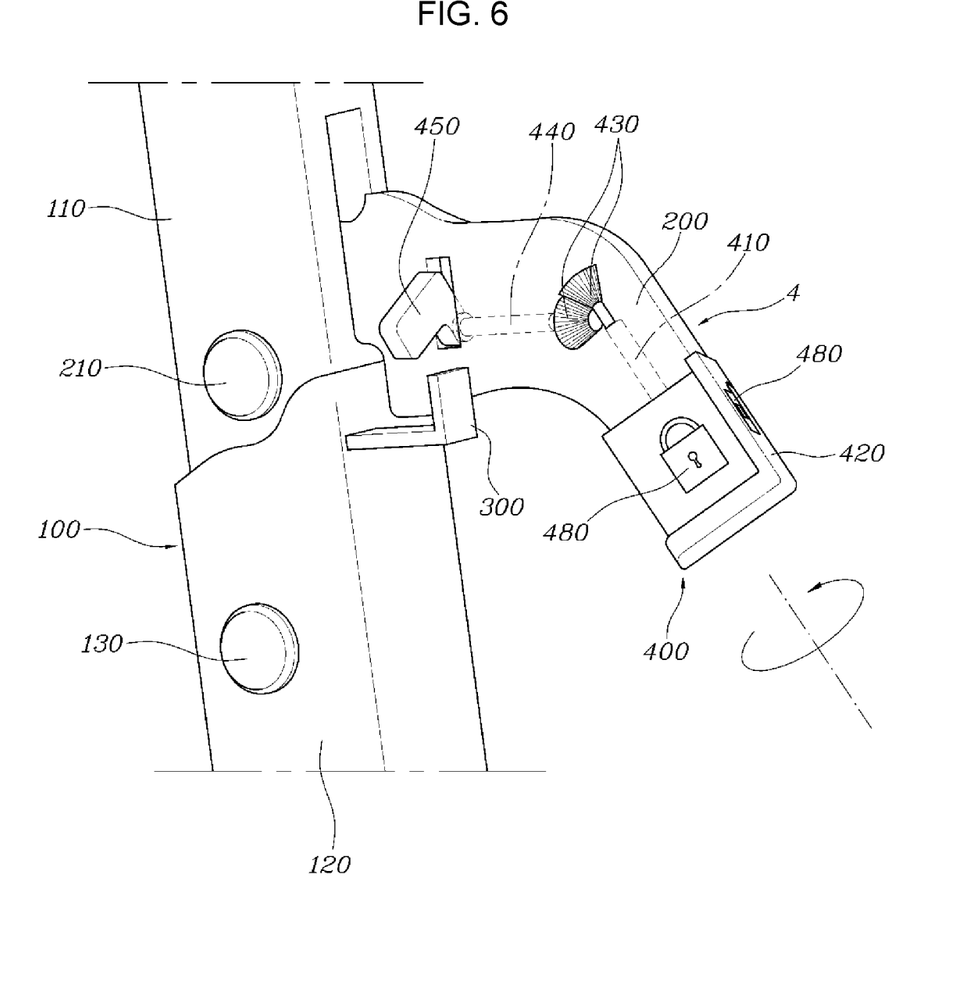
FIG. 6 is a view exemplarily illustrating the process in which the rotation lever is rotated clockwise in FIG. 4.
Figure 7:
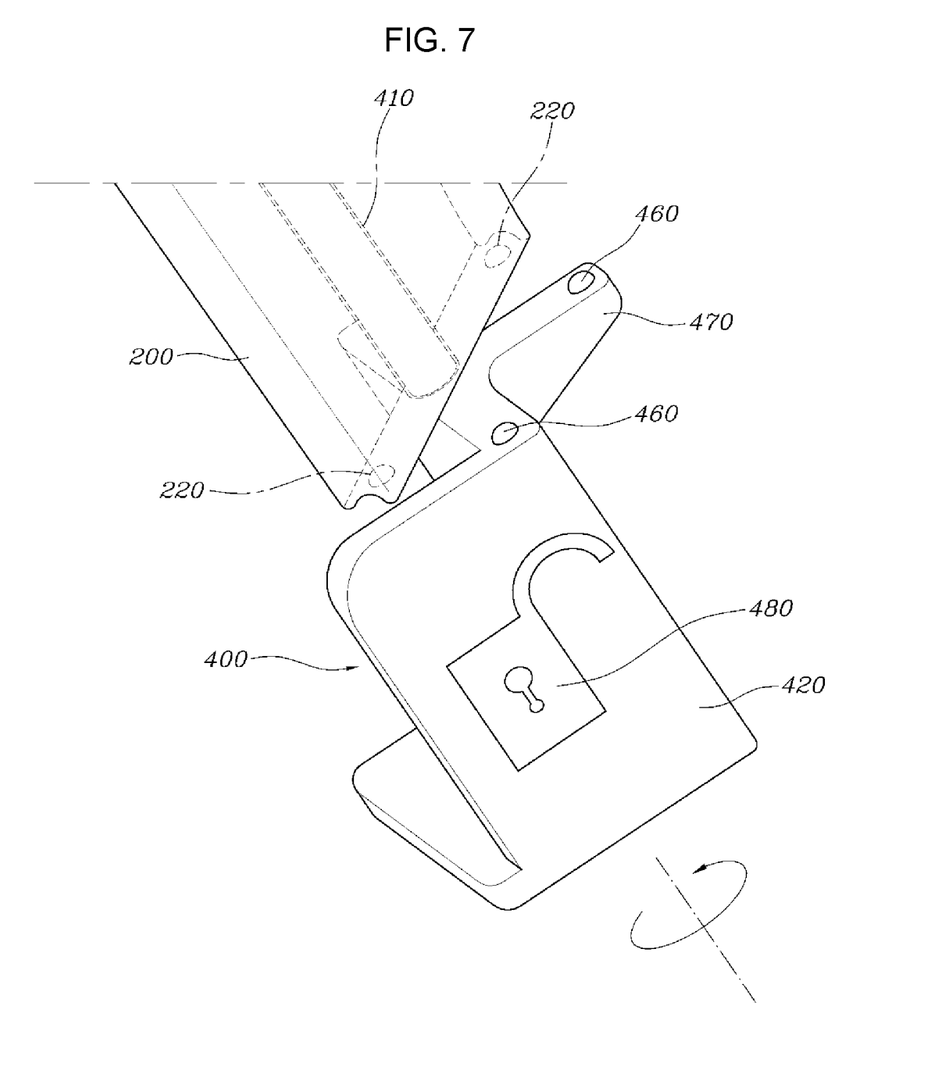
FIG. 7 is a view exemplarily illustrating a portion to which a rotation lever is connected in FIG. 6.

Therefore, when the rotation of the rotation lever 420 is constrained as the two protrusions 460 are inserted into the two concave grooves 220 as illustrated in FIGS. 4 to 5, the stay lever 200 switches to the unlocked state in which the stay lever is rotatable.

Figure 9:
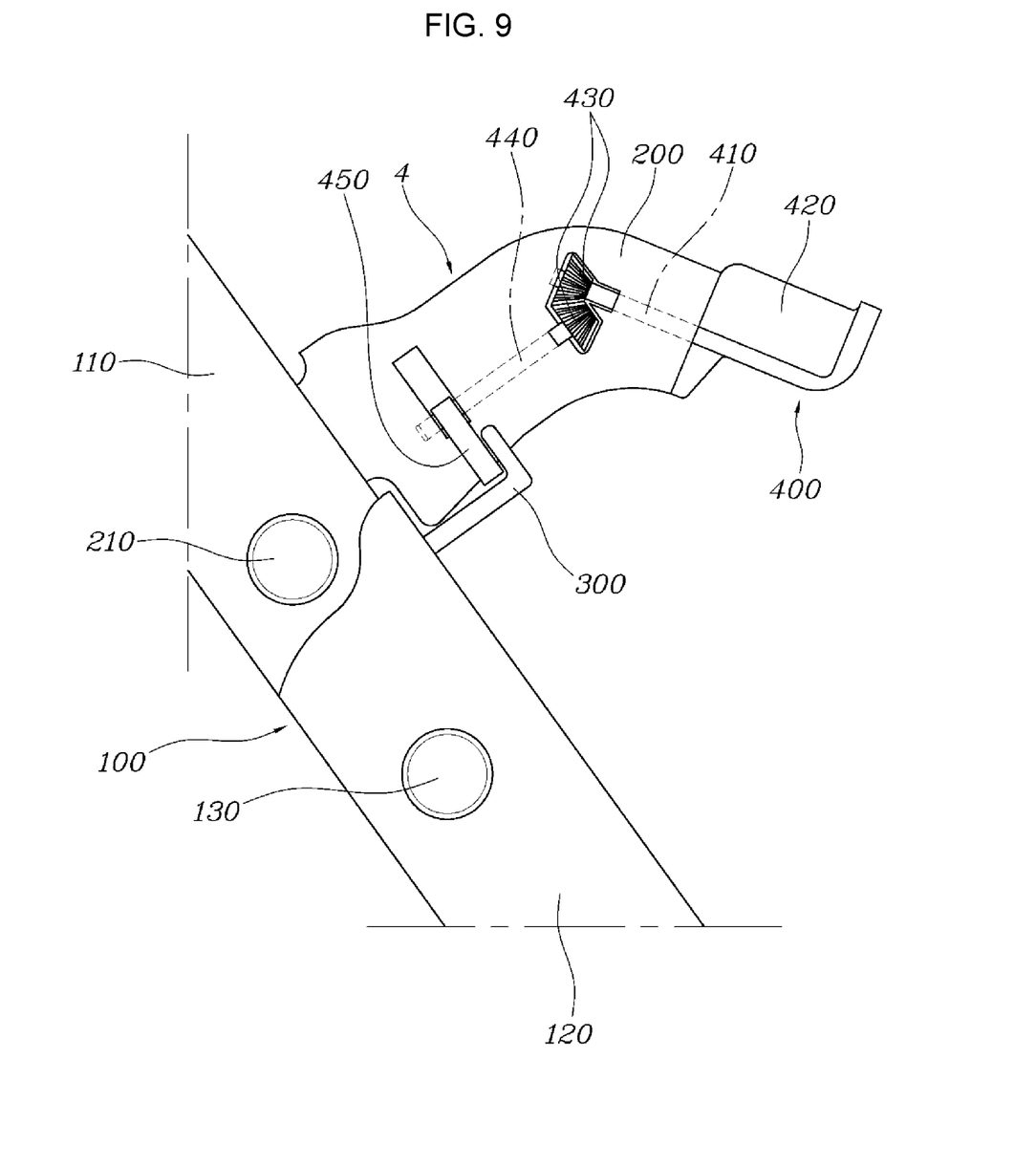
FIG. 9 is a side view of FIG. 8.
Figure 10:
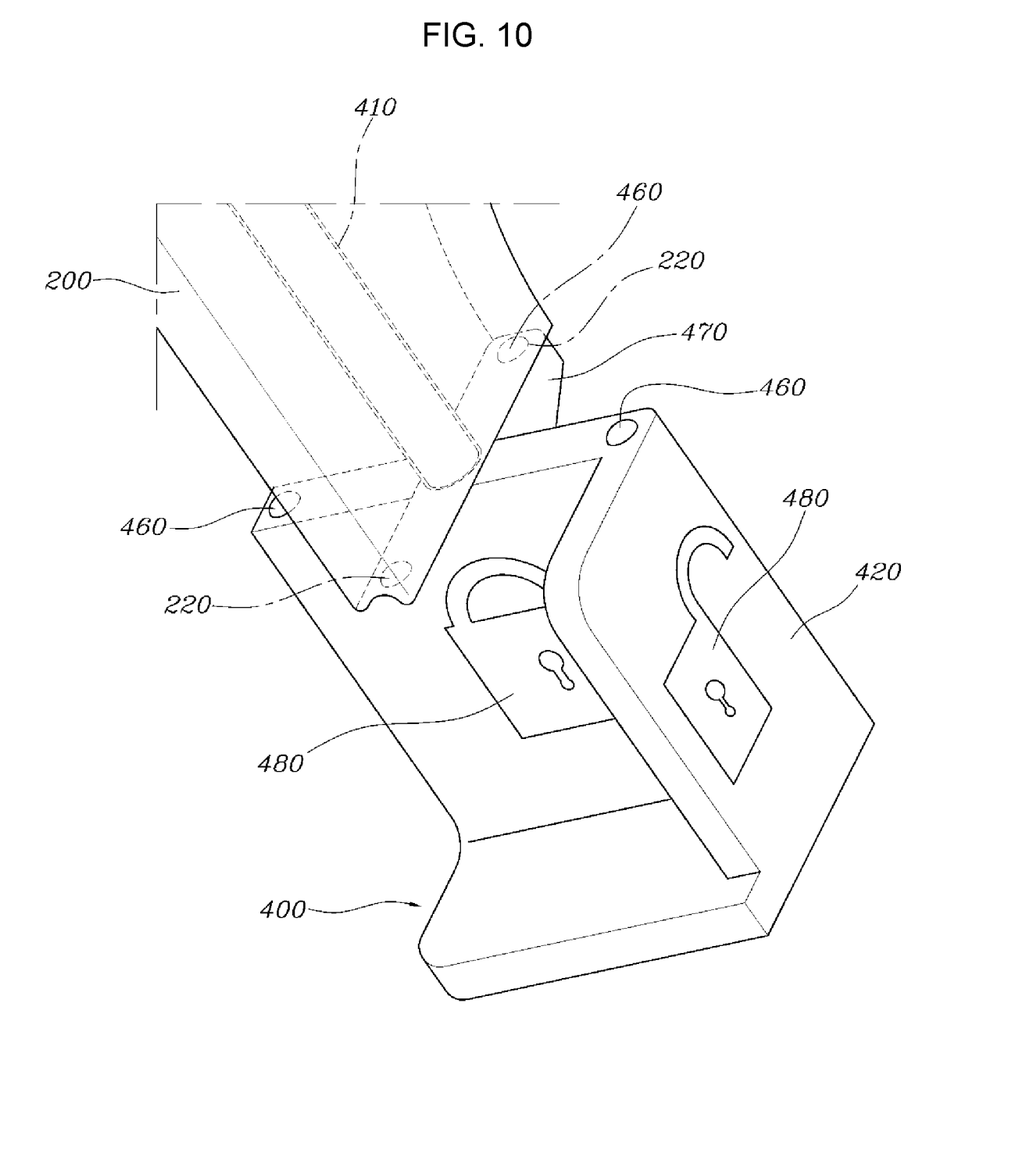
FIG. 10 is a view exemplarily illustrating a portion to which the rotation lever is connected in FIG. 8.

When the rotation lever 420 rotates at a 90 degree angle clockwise as illustrated in FIG. 8, FIG. 9 and FIG. 10 from the unlocked state as described above, only one protrusion 460 provided in the flange portion 470 is inserted into the concave groove 220 so that the rotation of the rotation lever 420 is constrained, switching to the locked state in which the stay lever 200 cannot be rotatable.

Furthermore, when the rotation lever 420 rotates at a 90 degree angle counterclockwise and returns to the original position as illustrated in FIGS. 4 to 5 from the locked state, the two protrusions 460 are inserted again into the two concave grooves 220, so that the rotation of the rotation lever 420 is restricted, switching back to the unlocked state in which the stay lever 200 is rotatable.

In the rotation lever 420, signs or texts 480 (emoticons) indicating the locked and unlocked states of the stay lever 200 are indicated at angular intervals of 90 degree, respectively. Through the signs or texts 480, the operator can visually know the locked state or the unlocked state of the stay lever 200.

As described above, according to the exemplary embodiment in which when the rotation lever 420 coupled to the stay lever 200 rotates, the stopper 450 is engaged with or disengaged from the hook ring 300, when the stopper 450 is engaged with hook ring 300, the stay lever 200 switches to the locked state in which rotation of the stay lever is impossible so that the tilting state of the front cab 1 being rotated forward is maintained, and when the stopper 450 is disengaged from the hook ring 300, the stay lever 200 switches to a rotatable unlocked state so that the front cab 1 rotated forward may be rotated into an original position thereof.

Thus, the front cab tilting stay apparatus according to various exemplary embodiments of the present invention is configured to allow for the tilting stay operation of the front cab 1 with a simple rotational operation of the rotation lever 420 coupled to the stay lever 200, contributing to an improvement of convenience and safety of operation.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A front cab tilting stay apparatus of a vehicle, the apparatus comprising:
    a stay rod connecting a vehicle body and a front cab;
    a stay lever and a hook ring provided in the stay rod; and
    a locking mechanism provided in the stay lever,
    wherein the locking mechanism includes a rotation lever rotatably coupled to the stay lever to drive a lever shaft, and
    wherein a tilting state of the front cab is configured to be maintained by an engagement between the locking mechanism and the hook ring in the tilting state of the front cab in which the stay rod is extended as the front cab is rotated in a predetermined direction.

2. The front cab tilting stay apparatus of claim 1, wherein the stay rod includes an upper stay rod portion and a lower stay rod portion rotatably coupled to each other via a connection pin, the upper stay rod portion rotatably coupled to the front cab and the lower stay rod portion rotatably coupled to of the vehicle body, and
    wherein the stay lever is fixedly mounted to the upper stay rod portion and the hook ring is fixedly mounted to the lower stay rod portion.

3. The front cab tilting stay apparatus of claim 2, wherein the hook ring is an "L"-shaped bracket protruding from the lower stay rod portion and then bent in a longitudinal direction of the lower stay rod portion.

4. The front cab tilting stay apparatus of claim 2,
    wherein the upper stay rod portion includes a lever pin to which the stay lever is connected, and
    wherein the lower stay rod portion includes a groove, to which the lever pin of the upper stay rod portion is selectively engaged according to rotations of the upper stay rod portion and the lower stay rod portion.

5. The front cab tilting stay apparatus of claim 1, wherein the locking mechanism further includes:
    a gear member and a rotation shaft connected each other, wherein the lever shaft is engaged to the gear member to sequentially transmit a rotational force of the lever shaft to the rotation shaft via the gear member, and wherein the rotation shaft and the lever shaft are rotatably mounted in the stay lever; and
    a stopper fixed to a first end portion of the rotation shaft to rotate with the rotation shaft.

6. The front cab tilting stay apparatus of claim 5,
    wherein a second end portion of the rotation shaft is engaged to a first end portion of the lever shaft via the gear member, and
    wherein a second end portion of the lever shaft is fixedly connected to the rotation lever.

7. The front cab tilting stay apparatus of claim 6,
    wherein the gear member includes a first bevel gear and a second bevel gear, and
    wherein a second end portion of the rotation shaft includes the first bevel gear and the first end portion of the lever shaft includes the second bevel gear gear-engaged to the first bevel gear.

8. The front cab tilting stay apparatus of claim 5, wherein when the stopper is engaged with the hook ring, a locked state of the stay lever to the lower stay rod portion is maintained so that a rotation of the stay lever is disabled, and when the stopper is disengaged from the hook ring, the stopper switches to an unlocked state to enable the rotation of the stay lever with respect to the lower stay rod portion.

9. The front cab tilting stay apparatus of claim 1, wherein the rotation lever is rotatably coupled to the stay lever via the lever shaft to extend in a longitudinal direction of the stay lever at an end portion of the stay lever.

10. The front cab tilting stay apparatus of claim 5,
    wherein in an unlocked state, the stopper rotates at a predetermined angle in a first direction and the stopper is not engaged with the hook ring,
    when the stopper is rotated and engaged with the hook ring, the stay lever moves to a locked state in which a rotation of the stay lever is disabled; and
    wherein when the rotation lever rotates at the predetermined angle in a second direction opposite to the first direction to return to an original position thereof, the stopper is rotated and disengaged from the hook ring and the stay lever transitions to the unlocked state in which a rotation of the stay lever is possible.

11. The front cab tilting stay apparatus of claim 10, wherein the predetermined angle is 90 degree.

12. The front cab tilting stay apparatus of claim 1, wherein one of the stay lever and the rotation lever is provided with at least a hemispherical concave groove and another of the stay lever and the rotation lever is provided with at least a hemispherical protrusion, so that a rotation angle of the rotation lever with respect to the stay lever is determined by the hemispherical protrusion being engaged to the hemispherical concave groove when the rotation lever rotates.

13. The front cab tilting stay apparatus of claim 12,
wherein the rotation lever includes a flange portion protruding from a surface of the rotation lever, and
wherein an end portion of the flange portion includes the hemispherical concave groove or hemispherical protrusion to be selectively engaged to the hemispherical concave groove or the hemispherical protrusion of the stay lever.

14. The front cab tilting stay apparatus of claim 13, wherein the flange portion protrudes in a right angle direction from the surface of the rotation lever.

15. The front cab tilting stay apparatus of claim 1, wherein a sign or text indicating locked and unlocked states of the stay lever is indicated at angular intervals of a predetermined angle on the rotation lever.

16. The front cab tilting stay apparatus of claim 15, wherein the predetermined angle is a 90 degree.

\* \* \* \* \*